(12) United States Patent
Schubert (10) Patent No.: US 6,384,568 B1
(45) Date of Patent: May 7, 2002

(54) INDUCTION MOTOR DRIVER

(75) Inventor: Thomas A. Schubert, Hoffman Estates, IL (US)

(73) Assignee: Electronic Design & Manufacturing, Inc., Schaumburg, IL (US)

( * ) Notice: Subject to any disclaimer, the term of this patent is extended or adjusted under 35 U.S.C. 154(b) by 0 days.

(21) Appl. No.: 09/721,084

(22) Filed: Nov. 22, 2000

(51) Int. Cl.$^7$ .......................... H02P 7/622; H02P 7/628
(52) U.S. Cl. ................. 318/808; 318/801; 318/811
(58) Field of Search ................. 318/727, 762, 318/767, 798–803, 807, 808, 810, 811; 363/34

(56) References Cited

U.S. PATENT DOCUMENTS

| | | | |
|---|---|---|---|
| 3,675,099 A | * 7/1972 | Johnston ................. 318/378 X |
| 3,983,463 A | * 9/1976 | Nabae et al. | |
| 4,009,427 A | * 2/1977 | Takahashi | |
| 4,099,108 A | * 7/1978 | Okawa et al. | |
| 4,249,120 A | * 2/1981 | Earle .......................... 318/729 |
| 4,330,741 A | * 5/1982 | Nagase et al. .............. 318/803 |
| 4,855,661 A | 8/1989 | Okamoto et al. ........... 318/807 |
| 4,999,561 A | 3/1991 | Kaga et al. ................. 318/812 |
| 5,053,690 A | 10/1991 | Mutoh et al. ............... 318/811 |
| 5,218,283 A | 6/1993 | Wills et al. ................. 318/748 |
| 5,252,905 A | 10/1993 | Wills et al. ................. 318/807 |
| 5,270,498 A | * 12/1993 | Tanahashi ................. 318/801 X |
| 5,422,557 A | 6/1995 | Lee et al. ................... 318/807 |
| 5,446,361 A | 8/1995 | Van Der Broeck ......... 318/747 |
| 5,673,189 A | 9/1997 | Schettler ..................... 363/137 |
| 5,734,250 A | 3/1998 | Lindmark ................... 318/801 |
| 5,767,653 A | 6/1998 | DeFiore et al. ............. 318/811 |
| 5,814,967 A | 9/1998 | Garces et al. ............... 318/807 |
| 5,828,200 A | * 10/1998 | Ligman et al. ............. 318/807 |

* cited by examiner

Primary Examiner—Bentsu Ro
(74) Attorney, Agent, or Firm—Marshall, Gerstein, & Borun.

(57) ABSTRACT

According to an aspect of the present invention, an induction motor driver includes a DC power supply having a selectively variable voltage. The driver also includes an inverter coupled to the DC power supply and coupleable to an induction motor, the inverter selectively actuateable to generate from the selectively variable voltage of the DC power supply a low-frequency series of square-shaped pulses, the series of square-shaped pulses having a frequency and each pulse having an amplitude related to the selectively variable voltage. The driver further includes a motor driver controller coupled to the inverter and the DC power supply, the motor driver controller including a first selectively variable signal source to provide a speed signal representative of a desired motor speed, an oscillator coupled to the selectively variable signal source to generate a control signal having a frequency representative of the speed signal, an inverter controller coupled to the oscillator and the inverter to selectively actuate the inverter to vary the frequency of the series of square-shaped pulses in direct relation to the frequency of the control signal, and a power supply controller coupled to the oscillator and the DC power supply to selectively vary the voltage of the power supply in direct relation to the frequency of the control signal.

1 Claim, 6 Drawing Sheets

INDUCTION MOTOR DRIVER

FIELD OF THE INVENTION

The present invention is directed to a motor driver, and in particular a motor driver for use with induction motors.

BACKGROUND OF THE INVENTION

Induction motors, and in particular fractional horsepower induction motors, are used in many household devices. For example, fractional horsepower induction motors are in widespread use in such household items as dishwashers and washing machines and in various industrial applications.

It is well known in the art to use a motor driver to control the induction motor, and in particular, the speed of the induction motor. The motor driver typically consists of a DC power supply, an inverter, and a controller for operating the inverter to generate a sinusoidal voltage waveform which is provided to the induction motor. The typical motor driver uses high frequency pulse-width modulation switch techniques to generate the sinusoidal voltage waveform.

Such drivers, however, are expensive. In the cost-competitive industry of home appliances, a few dollars difference in price can be the deciding factor in a consumer's decision to buy one product or another. Therefore, a lower cost alternative to the typical AC driver could have a significant impact on the marketplace.

One alternative to the combination of an induction motor and an AC driver is the combination of a DC motor and a DC driver. However, the cost of the DC motor/DC driver combination is typically even more expensive than the induction motor/AC driver combination. Therefore, this combination is not the alternative which the industry is seeking.

SUMMARY OF THE INVENTION

According to an aspect of the present invention, an induction motor driver includes a DC power supply having a selectively variable voltage. The driver also includes an inverter coupled to the DC power supply and coupleable to an induction motor, the inverter selectively actuateable to generate from the selectively variable voltage of the DC power supply a low-frequency series of square-shaped pulses, the series of square-shaped pulses having a frequency and each pulse having an amplitude related to the selectively variable voltage. The driver further includes a motor driver controller coupled to the inverter and the DC power supply, the motor driver controller including a first selectively variable signal source to provide a speed signal representative of a desired motor speed, an oscillator coupled to the selectively variable signal source to generate a control signal having a frequency representative of the speed signal, an inverter controller coupled to the oscillator and the inverter to selectively actuate the inverter to vary the frequency of the series of square-shaped pulses in direct relation to the frequency of the control signal, and a power supply controller coupled to the oscillator and the DC power supply to selectively vary the voltage of the power supply in direct relation to the frequency of the control signal.

BRIEF DESCRIPTION OF THE PREFERRED EMBODIMENT

An induction motor driver according to the present invention includes a variable voltage DC power supply, an inverter and a controller. The inverter is coupled to the power supply, and the controller is coupled to both the power supply and the inverter. The controller controls the voltage of the variable voltage DC power supply and the frequency of the inverter to control the amplitude and frequency of a series of rectangularly-shaped pulses generated from the voltage of the DC power supply.

It is thought that the response of an induction motor to the series of rectangularly-shaped pulses will be substantially similar to that of a sinusoidal waveform, but with significant advantages. That is, it is believed that the inductance of the windings of the induction motor will filter out the higher harmonics of the rectangularly-shaped waveform, and cause the motor to operate as if it was provided with a sinusoidal waveform. However, the cost of the equipment necessary to produce a series of rectangularly-shaped waveforms is far less than the cost of the equipment to produce a sinusoidal waveform, and as such, the cost of the motor driver should be significantly less.

Moreover, by controlling the amplitude and frequency of the series of rectangularly-shaped pulses, additional advantages may be achieved. For example, the controller may control the output of the power supply and the inverter to vary the amplitude and frequency of the series according to a direct rule, i.e. the amplitude increases in response to increases in frequency, and the amplitude decreases in response to decreases in frequency. As a consequence, the induction motor may be operated at levels exceeding the suggested power rating while avoiding overheating and core saturation, because the higher voltage causing the increase in power is applied for a very limited period of time before reversing polarity.

Figure 1:
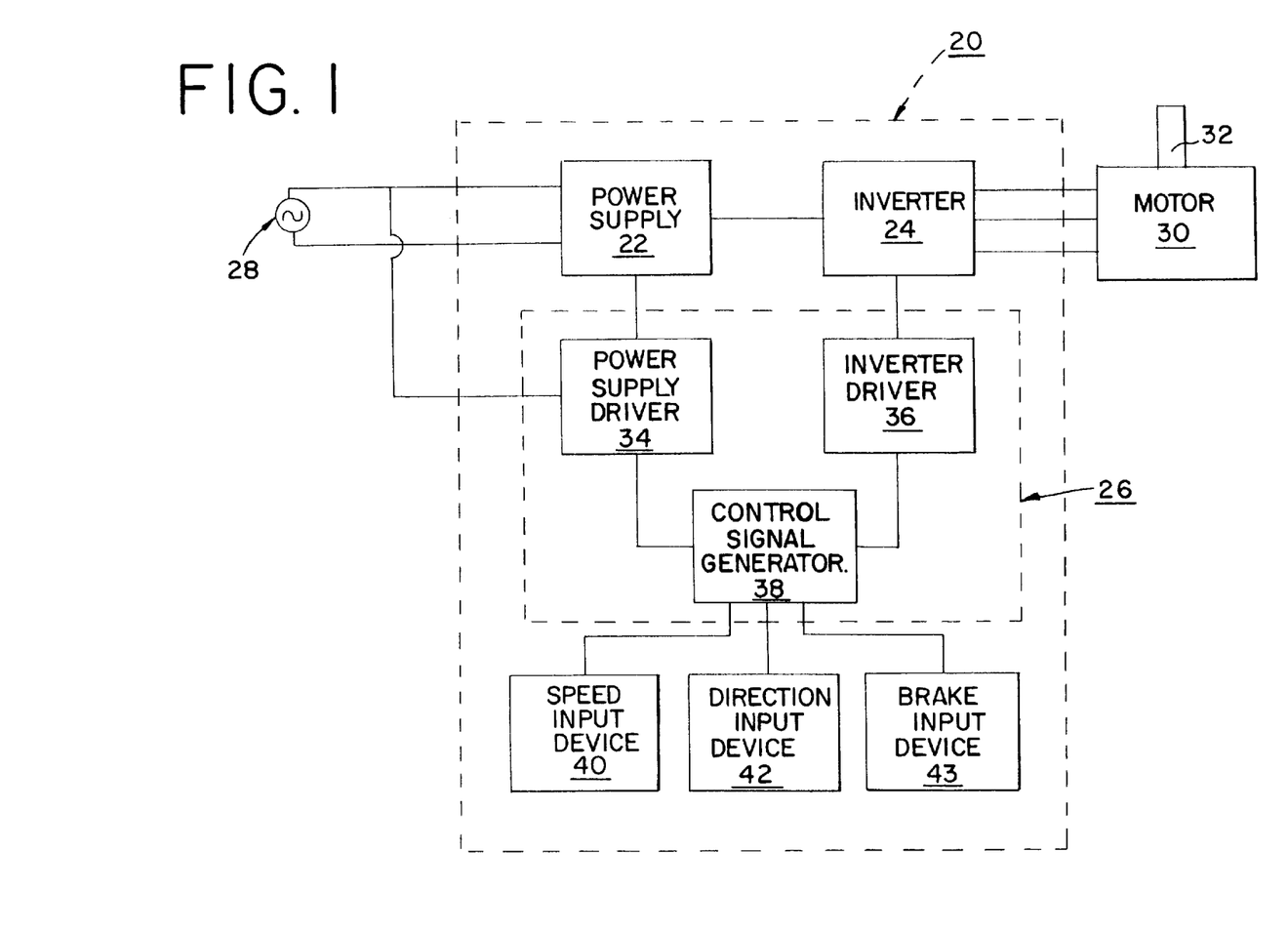
FIG. 1 is a block diagram of an induction motor driver according to the present invention coupled to an induction motor.

The structure of an induction motor driver 20 according to the present invention is now discussed relative to the block diagram of FIG. 1. The driver 20 includes a variable voltage DC power supply 22, an inverter 24 and a controller 26. The power supply 22 is coupled to a conventional 120 V, 60 Hz AC power source 28. The inverter 24 is coupled to the power supply 22, and converts a DC voltage provided by the power supply 22 into a series of rectangularly-shaped pulses. The series of pulses are provided to an induction motor 30 having a shaft 32 to cause the shaft 32 to move at a given speed in a given rotational direction (clockwise or counterclockwise).

The controller 26 includes a power supply driver 34 and an inverter driver 36. The power supply driver 34 controls the magnitude of the DC voltage provided by the power supply 22 to the inverter 24. The inverter driver 36 controls the switching frequency of the inverter 24 to control the pulse width and frequency of the pulses of the series of rectangularly-shaped pulses provided to the motor 30.

Common control over the power supply driver 34 and the inverter driver 36 is maintained by a control signal generator 38. The control signal generator 38 generates a control signal which is provided to the power supply driver 34 and the inverter driver 36 to control the magnitude of the DC voltage and the frequency of the series of rectangularly-shaped pulses, respectively.

At least one characteristic of the control signal, for example a frequency, is varied in accordance with signals received from a speed input device 40, a direction input device 42 and a brake input device 43. The speed input device 40 provides a signal to the control signal generator 38 which is representative of a desired speed for the shaft 32 of the motor 30. In one exemplary embodiment having particular usefulness in heating and/or air conditioning applications, the speed input device 40 may include a network with a thermistor or other temperature sensor to vary the motor speed based on temperature; the network may also have circuitry to operate at the motor 30 at predetermined speeds for predetermined temperature ranges. The direction input device 42 provides a signal representative of a desired direction for rotational movement of the shaft 32 of the motor 30. The brake input device 43 provides a signal representative of a desired decrease in speed to zero. The brake input device 43 may also a stop input device.

Figure 2:
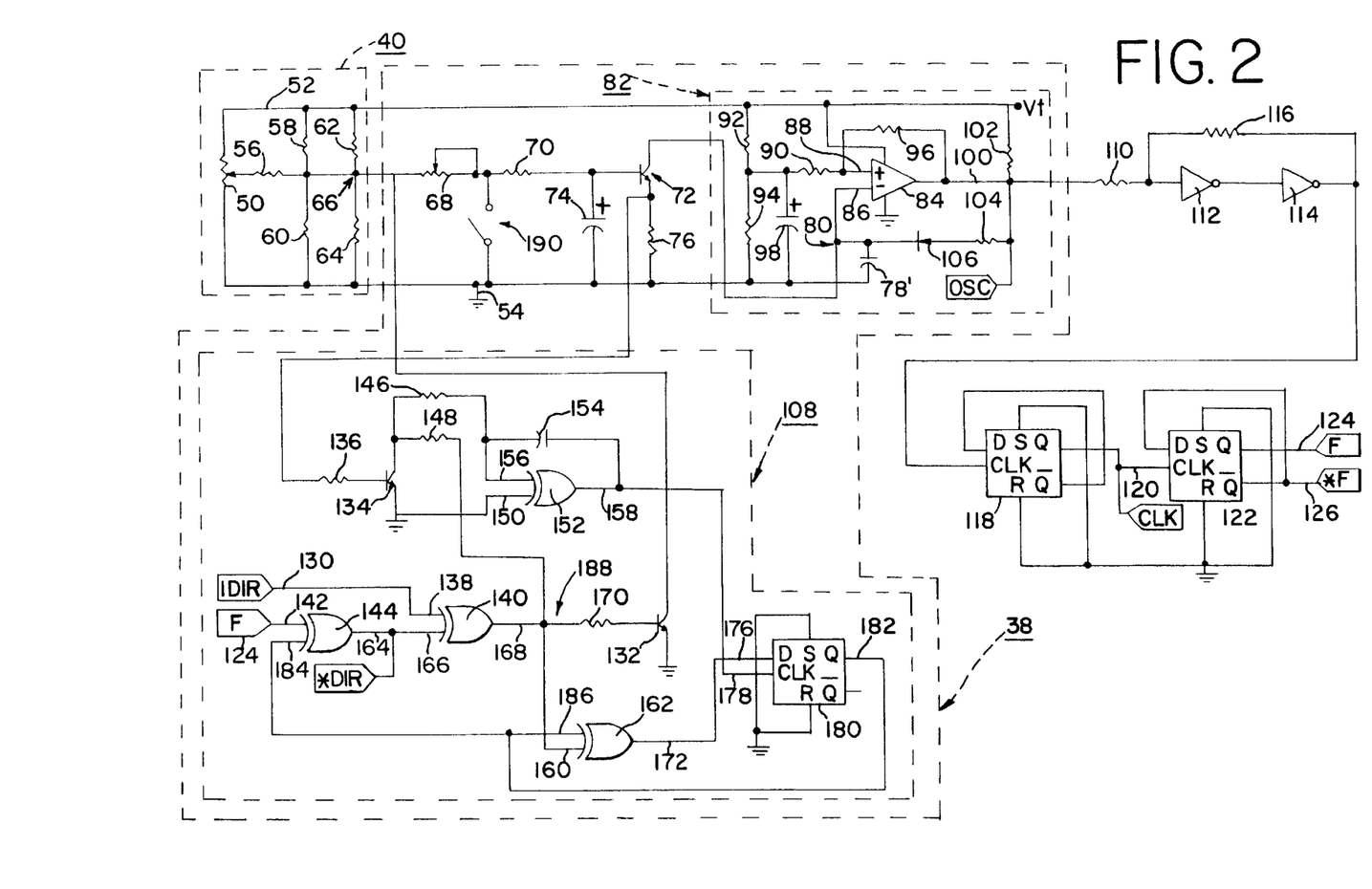
FIG. 2 is a schematic diagram of a first portion of a controller of the induction motor driver according to the present invention.

The structure and operation of a preferred embodiment for implementing the block diagram of the induction motor drive 20 of FIG. 1 is shown in FIG. 2.

Starting at one end, a first variable resistor 50 is provided, coupled between a line 52 and a ground 54. The first variable resistor 50 is coupled to a resistor 56, which is in turn coupled to resistors 58, 60 and trimmer resistors 62, 64 (i.e. the presence of the resistors 62, 64 depends on the variances in the values of the resistors 58, 60; if not needed, one or both of the resistors 62, 64 may be removed from the circuit), which are also coupled between the line 52 and the ground 54. The first variable resistor 50 is used to set a variable voltage, while the resistors 56, 58, 60, 62, 64 act as a voltage limiter by preventing the variable voltage set by the first variable resistor 50 from exceeding a first voltage and from dropping below a second voltage.

As a consequence of the operation of the circuit including resistors 50, 56, 58, 60, 62, 64, a voltage is provided at a junction 66 which is representative of a desired speed for the shaft 32 of the induction motor 30 within a range of predetermined values. Thus, in this preferred embodiment, the circuit including resistors 50, 56, 58, 60, 62, 64 corresponds to the speed input device 40 described above, although it is not necessary that the voltage limitation feature be part of the speed input device 40 in all embodiments of the speed input device 40.

The junction 66 is, in turn, coupled to a second variable resistor 68. The second variable resistor 68 is used to control the sensitivity of controller 26 to changes in the voltage at junction 66 as will be explained in greater detail below. It maybe noted at this point, however, that while it is intended that adjustments may be made to the speed of the shaft 32 of the motor 30 and the sensitivity of the controller 26 by varying the values of the variable resistors 50, 68, the physical accessability to the variable resistor 68 may be restricted to a greater degree than to the variable resistor 50. That is, because the sensitivity of the controller 26 is a function not typically adjusted by the end user, while the speed of the motor 30 is a function more commonly adjusted by the end user, it may be appropriate to place physical restrictions on access to the variable resistors 50, 68 commensurate with the likelihood that an adjustment will be made by the end user.

The second variable resistor 68 is also coupled to a resistor 70, which is in turn coupled to the base of a transistor 72 and the first terminal of a capacitor 74. The second terminal of the capacitor 74 is coupled to the ground 54. A resistor 76 is coupled between the emitter of the transistor 72 and the ground 54, while the collector of the transistor 72 is coupled to a capacitor 78 at a junction 80. The resistors 68, 70, 76, the transistor 72, and the capacitor 74 control the rate of discharge of the capacitor 78 in the following manner.

Initially, the capacitor 74 charges, via the resistors 68, 70, to the voltage set at the junction 66 by the circuit including the resistors 50, 56, 58, 60, 62, 64. The voltage present at the first terminal 74 is also applied to the base of the transistor 72, causing the transistor 72 to turn on. By turning on the transistor 72, current is allowed to flow through the resistor 76 to the ground 54, discharging the capacitor 78. By removing the voltage from the base of the transistor 72, flow of current through the resistor 76 will cease, and the capacitor 78 will not be discharged.

The capacitor 78 is one element of an oscillator circuit 82 which forms part of the control signal generator 38 described above. The oscillator circuit 82 includes an comparator 84, which has its inverting input 86 coupled to the junction 80 and its non-inverting input 88 coupled to the combination of resistors 90, 92, 94, feedback resistor 96 and capacitor 98 which set a reference voltage at the non-inverting input 88. The comparator 84 determines when the time-varying voltage of the capacitor 78 at the inverting input 86 drops below the reference voltage at the noninverting input 88. When the time-varying voltage drops below the reference voltage, the output 100 of the comparator goes high, and remains high until the capacitor 78 is recharged through resistors 102, 104 and the diode 106.

The product of the oscillator circuit 82 is thus a series of pulses varying in frequency in accordance with the voltage at the junction 66, which controls the discharge rate of the capacitor 78 and thus the rate at which the comparator 84 is triggered to its on state. Variations in the voltage at the junction 66 will thus cause variations in frequency of the triggering of the comparator 84 to the on state, which in turn affects the frequency of the series of pulses. For example, as the voltage at the junction 66 increases, the transistor 72 is turned on more and more strongly, allowing the capacitor 78 to discharge more quickly through the resistor 76. As the capacitor 78 discharges more quickly through the resistor 76, the comparator 84 will cycle more quickly between the high and low states at its output 100.

According to this preferred embodiment of the present invention, the output of the comparator 84 (and thus of the oscillator 82) corresponds to the control signal provided by the control signal generator 38 described above. Further, the control signal generator 38 preferably includes the oscillator 82 and the associated discharging circuitry for the capacitor 78 discussed above.

In addition, as shown in FIG. 2. the control signal generator 38 according to a preferred embodiment of the present invention includes a reverse direction module 108. However, to explain the operation of the reverse direction module 108, it is first necessary to discuss part of the inverter driver 36, which is shown in FIGS. 2–4.

The output 100 of the comparator 84 is connected to a resistor 110. The resistor 110 is connected to the combination of first and second invertors 112, 114 and a resistor 116. The invertors 112, 114 and the resistors 110, 116 are used to clean up the output signal (control signal) from the comparator 84.

The output of the combination of the invertors 112, 114 and the resistor 116 is coupled to a first flip-flop 118. In turn, the output 120 of the first flip-flop 118 is coupled to a second flip-flop 122, which has outputs 124, 126. Flip-flops 118, 122 are both wired as divide-by-two circuits. As will be recognized, the signals at the outputs 124, 126 are inverses of each other.

Figure 3:
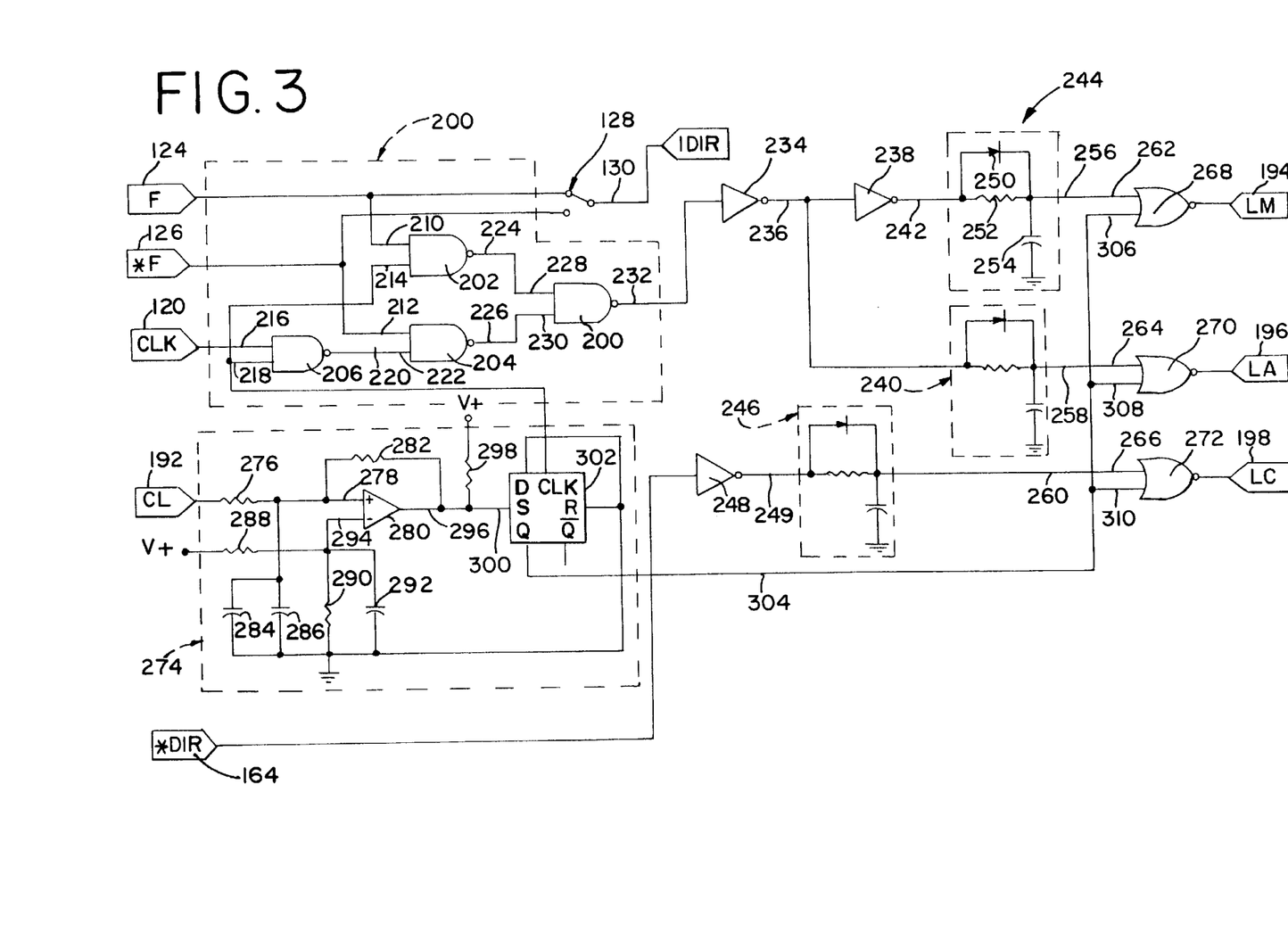
FIG. 3 is a schematic diagram of a second portion of the controller of the induction motor driver according to the present invention.
Figure 4:
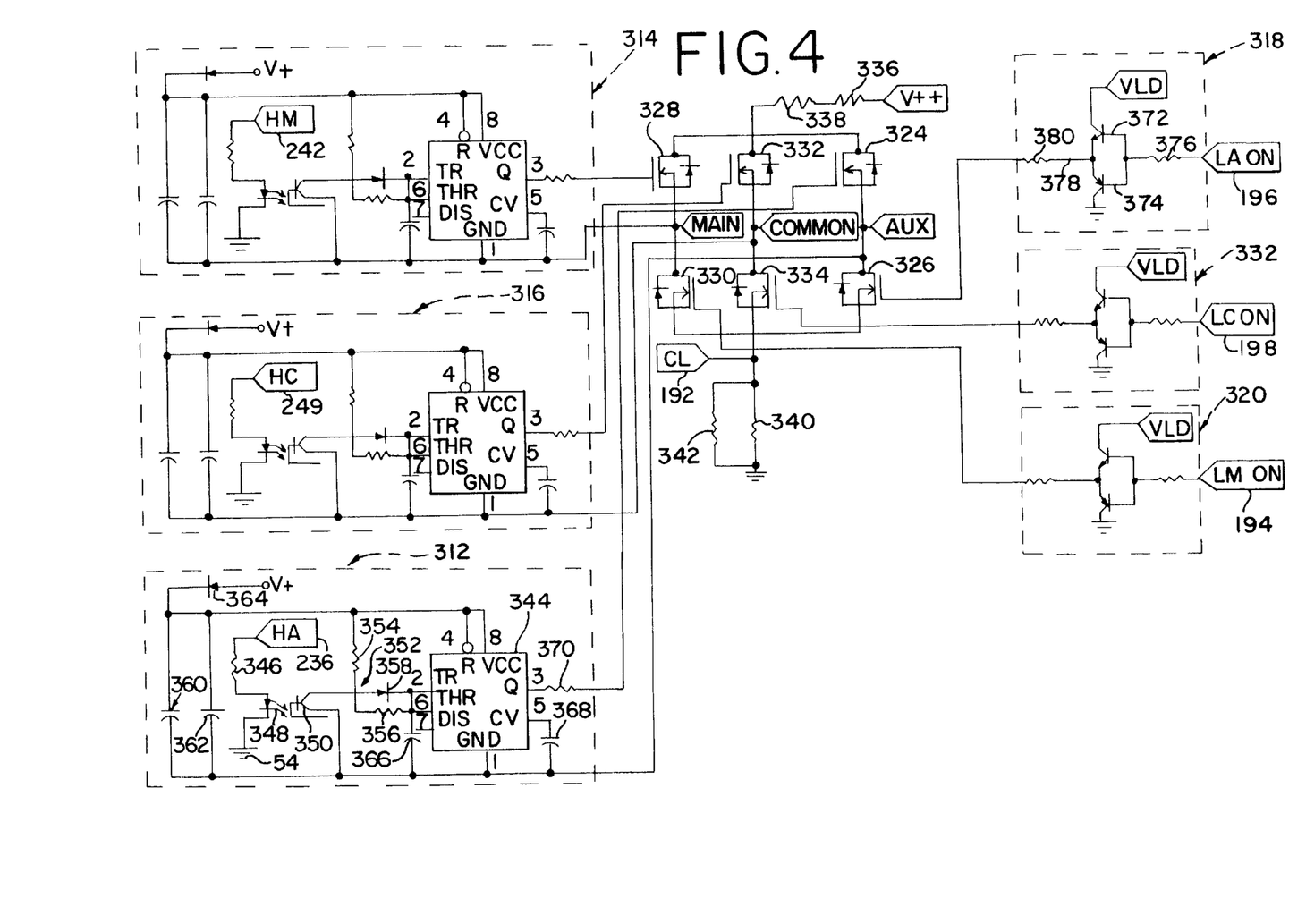
FIG. 4 is a schematic diagram of a third portion of the controller of the induction motor driver according to the present invention and an inverter coupled to the controller.

As seen in FIG. 3, the outputs 124, 126 are coupled to a switch 128, which corresponds to the direction input device 42 described above. The switch 128 is a single pole, double throw switch, having an output 130 which is coupled to the reverse direction module 108 of the control signal generator 38. By placing the switch 128 in one of two operative positions, either the signal on the output 124 or the output 126 is provided to the reverse direction module 108.

The structure and operation of the reverse direction module 108 is now discussed with reference to FIG. 2.

The reverse direction module 108 includes a transistor 132 having its collector coupled to the junction 66 and a transistor 134 coupled at its base via a resistor 136 to the emitter of the transistor 72. Additionally, the output 130 is coupled to a first input 138 of an exclusive OR gate 140, and the output 124 is coupled to a first input 142 of an exclusive OR gate 144. The transistor 134 has its collector connected to a first resistor 146 and a second resistor 148, and its emitter grounded. An input 150 of exclusive OR gate 152 is also grounded. The second terminal of the resistor 146 is coupled to a first terminal of a capacitor 154 and a second input 156 of the OR gate 152. The second terminal of the capacitor 154 is coupled to an output 158 of the exclusive OR gate 152. The second terminal of the resistor 148 is coupled to a first terminal 160 of an exclusive OR gate 162. An output 164 of the exclusive OR gate 144 is provided to a second input 166 of the exclusive OR gate 140. An output 168 of the exclusive OR gate 140 is coupled via resistor 170 to the base of the transistor 132. An output 172 of the exclusive OR gate 162 and the output 158 of the exclusive OR gate 152 are coupled to inputs 176, 178 of a flip-flop 180. An output 182 of the flip-flop 180 is coupled to the inputs 184, 186 of the exclusive OR gates 144, 162, respectively.

The reverse direction module 108 operates as follows.

Assuming that a steady-state speed has been achieved for the shaft 32 of the induction motor 30, a relatively constant voltage will be applied to the base of the transistor 134, thus turning the transistor 134 on. Turning on the transistor 134 will pull the first terminals of the resistors 146, 148 to the ground 54, thus causing the inputs 150, 156 of the OR gate 152 to both be at ground. At the same time, because the inputs 138, 166 to the exclusive OR gate 140 are the same, the output 168 to the exclusive OR gate 140 is low, causing the transistor 132 to be turned off. In this configuration there will be no change to the state of the flip-flop 180 for two reasons. First, by pulling the input 156 to ground, the trigger for the flip-flop 180, the exclusive OR gate 152, cannot be activated. Additionally, because the input 160 (connected to the junction 188) is low, the exclusive OR gate 162, acting as a non-inverting buffer, prevents the flip-flop 180 from changing states even if a transient signal were to appear on input 178 by presenting the present state of output 182 to input 176. Thus, there is a redundancy built into the module 108 to prevent the module 108 from reacting to a false positive for direction change.

When the switch 130 is moved from a first position representative of the steady-state motor shaft direction, for example clockwise, already achieved to a second position indicating a second motor shaft direction, for example counterclockwise, to be achieved, the inputs 138, 166 to the exclusive OR gate 140 will no longer be equal, causing the output 168 to go high. This in turn causes the transistor 132 to turn on, pulling the junction 66 to ground. As a consequence, the capacitor 74 discharges through the series combination of the resistors 68, 70.

As the capacitor 74 discharges, the transistor 72 is turned more and more off, allowing less and less current through the resistor 76, increasing the discharge time of the capacitor 78. As the capacitor 78 takes more and more time to discharge, more and more time occurs between the pulses generated by the oscillator 82. Eventually, the capacitor 74 is fully discharged, and the transistor 72 turns off, preventing discharge of the capacitor 78, triggering of the oscillator 82 and generation of the pulses at the output 100.

Also, sending the output 168 high also causes the output 172 of the exclusive OR gate 162 to act as an invertor for output 182, presenting the inverse of the output 182 to input 176, which allows the state of the flip-flop 180 to be changed when the trigger (the exclusive OR gate 152) fires. When the capacitor 74 has fully discharged, the transistor 72 will be turned off, causing the base of the transistor 134 to go to ground. This actuates the trigger (the exclusive OR gate 152) causing a single-shot pulse to be provided to the flip-flop 180, causing the flip-flop 180 to change states.

By changing the state of the flip-flop 180, the outputs 138, 166 again match. This causes the output 168 of the exclusive OR gate 140 to go low, causing the transistor 132 to turn off. Turning off the transistor 132 causes the capacitor 74 to begin to charge again, turning on the transistor 72. As a consequence, the voltage across the resistor 76 increases, turning on the transistor 134. As the voltage on the capacitor 74 increases, the rate at which the oscillations from the oscillator 82 provided to the remainder of the circuit increase, thereby increasing the speed of the shaft 32 of the motor 30.

As such, one of ordinary skill in the art will understand that according to the operation of the reverse direction module 108 upon changing the state of the switch 130 indicative of a desired change in the direction of the rotation of the shaft 32 of the induction motor 30, the speed of the shaft 32 will slowly decrease to a zero value. After passing through the zero value, the speed of the shaft 32 will ramp up to the desired speed in the desired direction in accordance with the sensitivity set by the user through the use of the variable resistor 68. As such, a gradual decrease and increase of speed will accompany a change in direction in accordance with the operation of the reverse direction module 108.

Alternatively, a switch 190 is provided to act as a brake for reducing the speed of the shaft 32 to a zero value. The switch 190 is a single pole, single throw switch, which when closed causes the capacitor 74 to discharge through the resistor 70, but not the resistor 68. The discharge through the resistor 70 causes a quicker reduction in speed to the zero value than the reverse direction circuit 108, because the resistor 68 in not series with the resistor 70 as part of the defined discharge path. The shaft 32 is maintained at a zero speed until the switch 190 is opened.

Figure 5:
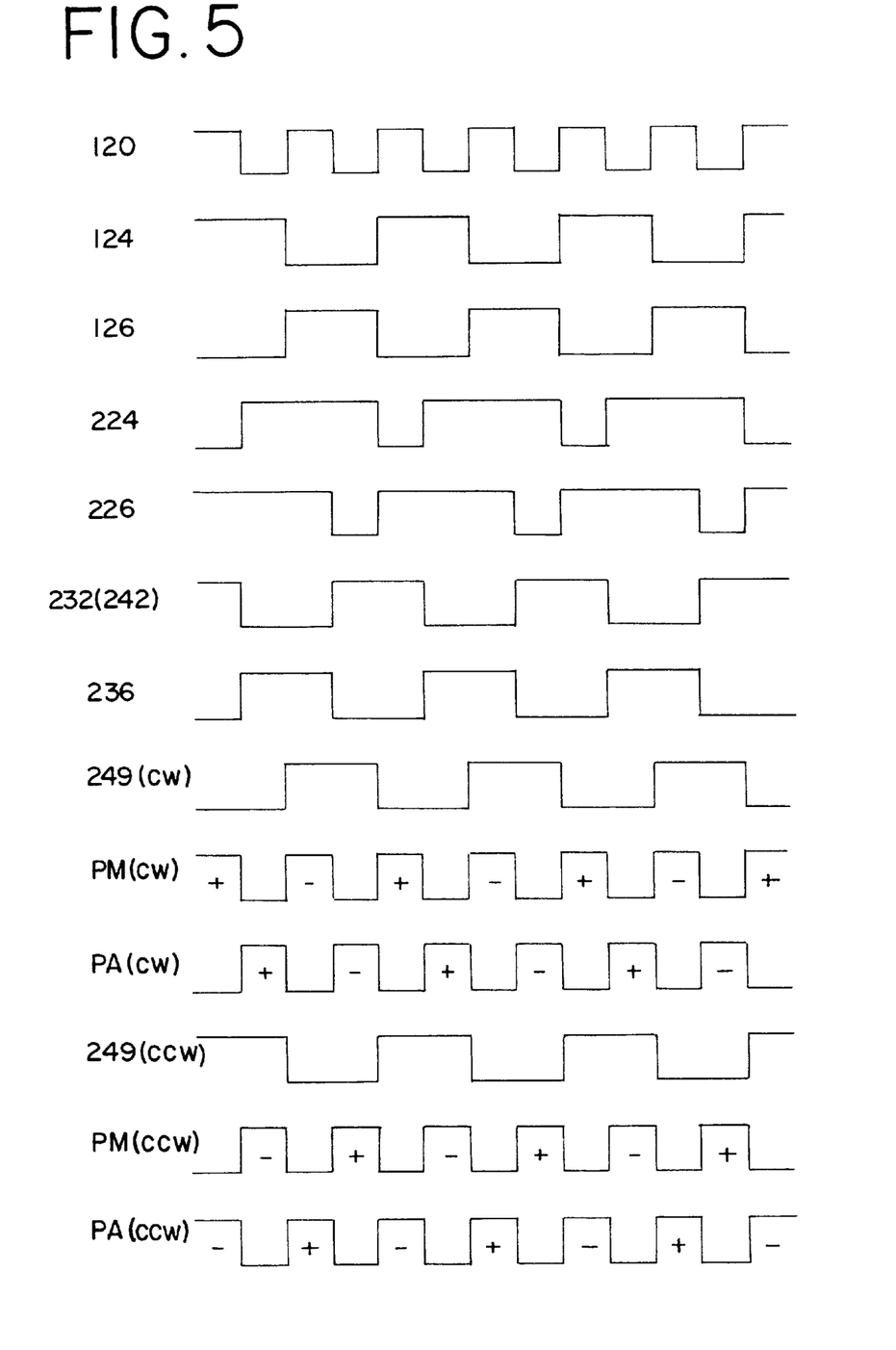
FIG. 5 is a timing diagram illustrating the logic carried out by a section of the controller of the induction motor driver according to the present invention shown in FIG. 3.

Having completed the discussion of the control signal generator 38, the structure and operation of the inverter driver 36 is now discussed with respect to FIGS. 3–5. As discussed above, outputs 124, 126 are coupled at the left edge of circuitry shown in FIG. 3., as are the output 120 of the flip-flop 118 and the output 164 of the exclusive OR gate 144. Additionally, a feedback output 192 from the inverter 24 (FIG. 4) is coupled to the circuitry of FIG. 3. The circuitry of the inverter driver 36 shown in FIG. 3 provides three outputs 194, 196, 198 at the right hand edge.

Specifically, the outputs 120, 124, 126 are coupled to a logic module 200. The logic module 200 includes NAND gates 202, 204, 206, 208. The inputs and outputs of the NAND gates 202, 204, 206, 208 are wired as follows. The output 124 of the second flip-flop 122 is coupled to a first input 210 of the NAND gate 202. Similarly, the output 126 of the second flipflop 122 is coupled to a first input 212 of the NAND gate 204. The output 120 of the first flipflop 118 is coupled to a second input 214 of the NAND gate 202. Additionally, the output 120 is coupled to both inputs 216, 218 of the NAND gate 206, which acts as an inverter. An output 220 of the NAND gate 206 is coupled to the second input 222 of the NAND gate 204. The outputs 224, 226 of the NAND gates 202, 204 are provided to the inputs 228, 230 of the NAND gate 208. The NAND gate 208 has an output 232.

The operation of the logic module 200 is now explained with reference to FIG. 5. For ease of reference, the signals have been identified with reference to the outputs 120, 124, 126, 224, 226, 232 in the left-hand margin.

The top line of FIG. 5 represents the signal at the output 120 of the first flip-flop 118. The second line represents the signal at the output 124 of the second flip-flop 122, and the third line represents the inverse signal which is present on the output 126 of the flip-flop 122. The fourth line of FIG. 5 shows the output 224 of the NAND gate 202. Similarly, the fifth line shows the output 226 of the NAND gate 204. The sixth line shows the signal at the output 232 of the NAND gate 208, which is a function of the outputs 224, 226 of NAND gates 202, 204.

Referring to again FIG. 3, the output 232 is provided to an inverter 234, which functions as a power amplifier. An output 236 of the inverter 234 is coupled in the first instance to an inverter 238, which inverts the signal at the output 236. The output 236 of the inverter 234 is also coupled to a dead time circuit 240, and similarly an output 242 of the second inverter 238 is coupled to a dead time circuit 244. Furthermore, the output 164 of the exclusive OR gate 144 is coupled to a dead time circuit 246 via an inverter 248.

The dead time circuits 240, 244, 246 include similar elements, and thus the structure of only the dead time circuit 244 is discussed below. The dead time circuit 244 includes a diode 250, a resistor 252 and a capacitor 254. The diode 250 and the resistor 252 are coupled in parallel, and the output of the parallel combination is coupled to a first terminal of the capacitor 254, the other terminal being coupled to the ground 54. The purpose of the dead time circuits 240, 244, 246 will be explained below. The outputs 256, 258, 260 of the dead time circuits 244, 240, 246 are coupled to first inputs 262, 264, 266 of NOR gates 268, 270, 272 having the outputs 194, 196, 198 referred to previously.

Also coupled to the NOR gates 268, 270, 272 is a current limiter module 274, which prevents the signals from the dead time circuits 240, 244, 246 from being passed to the gate drivers mentioned below for activating the inverter 24 to prevent a runaway condition from occurring in the motor 22 or damage to the driver 20 from overcurrent. Specifically, the current limiter module acts to deactivate the inverter 24 for a half-cycle to stabilize the current.

The current limiter module 274 includes a resistor 276 which is coupled to the output 192 and to a non-inverting input 278 of a comparator 280, as are a feedback resistor 282 and capacitors 284, 286. The current limiter module 274 also includes resistors 288, 290 and a capacitor 292, which couple a voltage $V^+$ to an inverting input 294 of the comparator 280. The output 296 of the comparator 280 is coupled, along with the voltage V via a pull-up resistor 298, to an input 300 of a flip-flop 302. Also coupled to the flip-flop 302 is the output 120. An output 304 of the flip-flop 302 is coupled to the second inputs 306, 308, 310 of the NOR gates 268, 270, 272.

In operation, if the voltage at the input 278 of the comparator 280, representative of a current passing through the inverter 24 exceeds a reference voltage coupled to the input 294 of the comparator 280, then the comparator 280. triggers the flip-flop 302 which prevents signals from being passed through the NOR gates 268, 270, 272 for a half-cycle. Once the flip-flop 302 determines, by way of the signal provided at the output 120, that the next half-cycle has begun, then the flip-flop 302 allows the signals to pass through the NOR gates 268, 270, 272. In this fashion, an overcurrent condition in the inverter 22 may be prevented The relationship between the outputs 236, 242, 249 is shown in FIG. 5, lines 6, 7 and 8 for the clockwise configuration and lines 6, 7 and 11 for the counterclockwise configuration. The outputs 236, 242, 249 are inverted and delayed by a period of time set by the dead time circuits 240, 244, 246, respectively, to eventually become the outputs 196, 194, 198. Because of the diodes 250 in the dead times circuits 242, 244, 246, the delay occurs only during the turning on of the drives 194, 196, 198.

The outputs 194, 196,198, 236, 242, 249 from FIG. 3 are provided to driver circuits 312, 314, 316, 318, 320, 322 in FIG. 4. The driver circuits 312, 314, 316, 318, 320, 322 are independently coupled to one of the plurality of transistors 324, 326, 328, 330, 332, 334, preferably MOSFET transistors, which along with the resistors 336, 338, 340, 342 make up the inverter 24.

The driver circuits 312, 314,316 are of a similar structure, as are the driver circuits 318, 320, 322. As such, only the structure and operation of the driver circuits 312, 318 will be discussed relative to the inverter 24, it being recognized that similar comments apply to driver circuits 314, 316, 320, 322.

Turning first to the driver circuit 312, the driver circuit 312 includes a chip 344, preferably a 555 chip. The pins of the chip 344 are numbered 1–8 as is well known in the art. The input 236 is coupled to the series combination of a resistor 346 and a light emitting diode 348, which is coupled to the ground 54. A phototransistor 350 is provided in proximity to the light emitting diode 348. The opto-isolation provided by the light emitting diode 348 and the phototransistor 350 is necessary as the driver circuit 312 must raise the voltage potential from the gate-to-source of the associated transistor 324 to allow the transistor 324 to be switched into conduction.

The transistor 350 has its collector coupled to a junction 352, where it is coupled to the first terminals of resistors 354, 356 and a diode 358. The other terminal of the resistor 354 is coupled to the first terminals of capacitors 360, 362 (the second terminals of capacitors 360, 362 being coupled to ground). Alternatively, capacitors 360, 362 could be replaced with a single capacitor. Also coupled to the other terminal of the resistor 354 is a diode 364 which is coupled to a voltage $V^+$. The other resistor 356 is coupled to the pin #6 of the chip 344. The second terminal of the diode 358 is coupled to the pin #2 of the chip 344, and to a terminal of a capacitor 366. Coupled to the pin #5 of the chip 344 is a capacitor 368. The output, or the pin #3, of the chip 344 is coupled to the gate of the transistor 324 via a resistor 370. Also, pin #2 and #6 are connected to each other.

Turning now to the gate drive 318, transistors 372, 374 are included, with their bases being coupled via the resistor 376 to the output 196. The signal provided at the output 196 is passed by the transistors 372, 374 to their output 378, which is coupled via resistor 380 to the gate of the transistor 326.

The purpose of the dead time circuits 240, 244, 246 may now be explained. The combination of the light-emitting diode 348 and the photoresistor 350 used in the driver circuits 312, 314, 316 does not have a fast switching characteristic. As a consequence, it is necessary to use the dead time circuits 240, 244, 246 so that the transistors 326, 330, 334 turn completely off before the transistors 324, 328, 332 start to turn on, and vice versa.

The operation of the driver circuits 312, 314, 316, 318, 320, 322 is illustrated in FIG. 5, with lines 6–10 for the clockwise rotation of the shaft 32 of the induction motor 30 and lines 6, 7, and 11–13 for the counterclockwise rotation. In FIGS. 6–13, PM$^+$ represents positive polarity across the main winding, while PM$^-$ represents negative polarity. Similarly, PA$^+$ represents positive polarity across the auxiliary winding, while PA$^-$ represents negative polarity.

Figure 6:
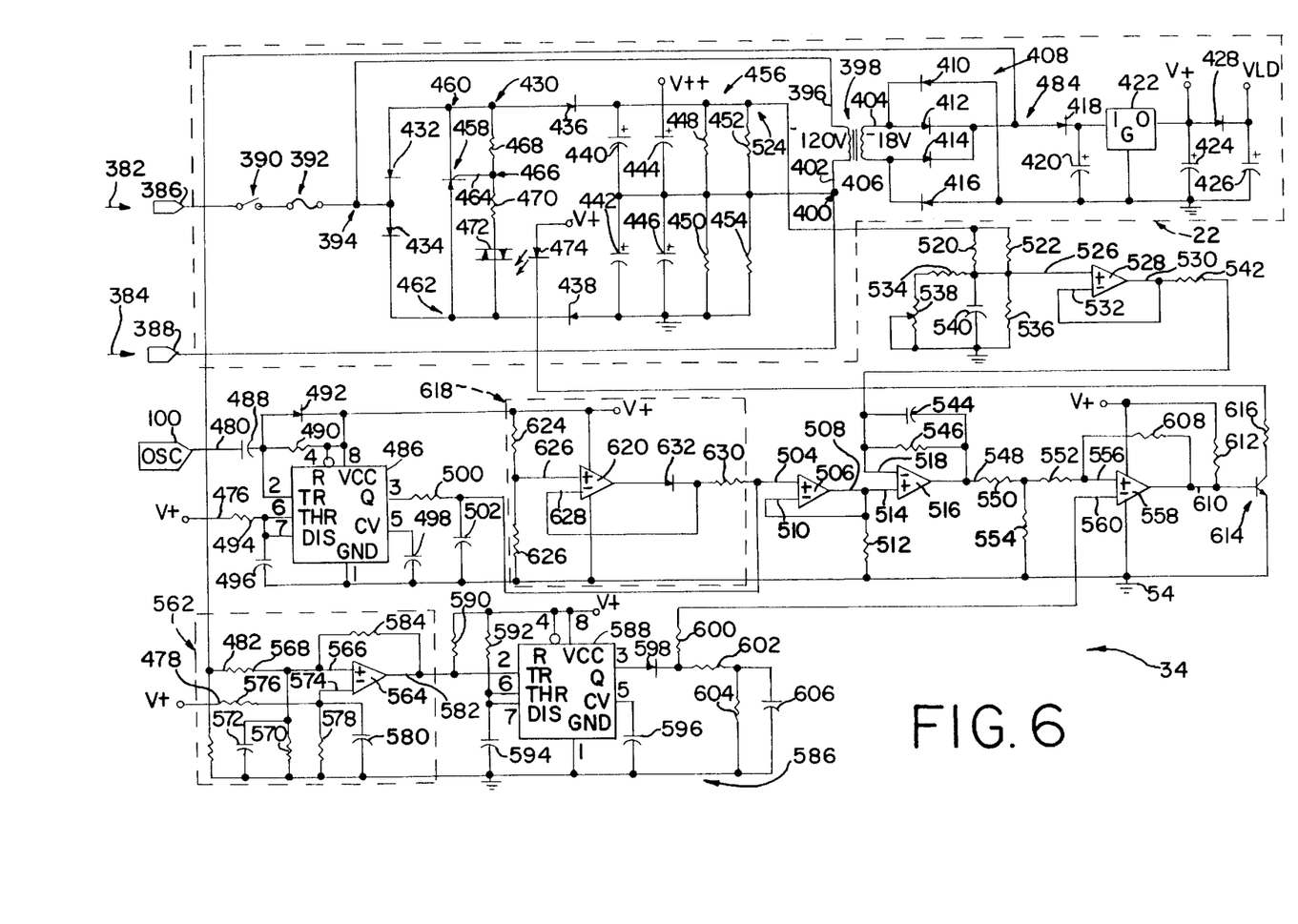
FIG. 6 is a schematic diagram of a DC power supply of the induction motor driver according to the present invention.

Turning now to FIG. 6, the power supply 22 and accompanying power supply driver 34 are illustrated. The power supply 22 is connectable to an AC power supply 382, 384 via inputs 386, 388. The input 386 is coupled via a switch 390 and a fuse 392 to a junction 394, which in turn is coupled to a first terminal 396 of a primary coil of a transformer 398. Similarly, the second input 388 is coupled at a junction 400 to a second terminal 402 of the primary coil of the transformer 398. Connected to first and second terminals 404, 406 of the secondary coil of the transformer 398 is a diode bridge 408 including diodes 410, 412, 414, 416. Coupled to the output of the bridge 408 is the combination of a diode 418, a capacitor 420, and a chip 422. The capacitor 420 functions to smooth the ripples in the voltage provided by the diode bridge 408 and the chip 422 acts as a further regulation device. The output of the chip 422 is a voltage V$^+$, which is used elsewhere in the induction motor driver 20. Also coupled to the chip 422 are capacitors 424, 426, and a diode 428. The output voltage of the chip 422, less the drop across the diode 428 is provided to the remainder of the motor driver 20 as the voltage labeled V$^{LD}$.

A second bridge of diodes 430 is provided to rectify the AC signal, although other circuits for rectifying AC waveform may also be used in the present invention. The diode bridge 430 includes diodes 432, 434, 436, 438. Coupled to the output of the diode bridge 430 are capacitors 440, 442, 444, 446 and resistors 448, 450, 452, 454, which collectively define a voltage doubler 456.

Also provided is a latch 458 coupled at junctions 460, 462 to the diode bridge 430. The gate 464 of the latch 458, which may be a SCR, is coupled at a junction 466 to a resistor 468 and the series combination of a resistor 470 and a phototriac 472.

It will be recognized that the voltage doubler 456 provides a DC voltage, designated V$^{++}$, which has a magnitude which is twice that of the AC waveform provided by line 382, 384 (approximately 50–250V depending on speed). The operation of this portion of the power supply, however, is regulated by the latch 458, such that the magnitude of the DC voltage designated V$^{++}$ may vary. The variance of the magnitude of the voltage V$^{++}$ is controlled by the power supply driver 34, which interfaces with power supply 22 via a light emitting diode 474 in the following fashion.

The power supply driver 34 has first and second inputs 476, 478 coupled to the voltage V$^+$. A third input 480 is coupled to the output 100 of the comparator 84 in FIG. 2. A fourth input 482 is coupled to the output of the diode bridge 408 at a junction 484.

A chip 486 is provided, preferably a 555 chip, which has its pins numbered in the conventional manner 1–8. The input 480 is coupled via a capacitor 488 to the pin #2. The pin #2 is also coupled to V$^+$ (the magnitude of which is approximately 12V) via the parallel combination of a resistor 490 and a diode 492, while pins #4 and #6 are directly coupled to V$^+$. Similarly, the input 476 is coupled via a resistor 494 to pins #6 and #7, which are also coupled to a capacitor 496 which is further coupled to the ground 54. Additionally, the pin #5 is coupled to a capacitor 498, which is coupled to the ground 54. The pin #1 is also coupled to the ground 54 directly.

The output, pin #3, of the chip 486 is coupled to a combination of a resistor 500 and a capacitor 502 which act as a filter. The output is further connected to the input 504 of a op-amp 506, which is wired to act as a unity gain voltage buffer by coupling its output 508 to a second input 510. A resistor 512 is also coupled to the output 508 of the op-amp 506 and to the ground 54.

The output of the op-amp 506, which is a voltage value representative of the frequency of the oscillations of the oscillator 82, is coupled to an input 514 of an op-amp 516 connected as a differential amplifier. The second input 518 of the op-amp 516 is coupled to a reference voltage which is used to adjust the voltage of the power supply 24 as will be explained below. The reference voltage provided at the input 518 is generated in the following fashion.

Two resistors 520, 522 have their first terminals coupled at a junction 524 to the voltage doubler 456, and particular, the high voltage side of the voltage doubler 456. The second terminals of the resistors 520, 522 are coupled to the non-inverting input 526 of an op-amp 528, which is configured as a unity gain voltage buffer by coupling an output 526 of the op-amp 528 to an inverting input 532 of the op-amp 528. Also coupled to the non-inverting input 526 are resistors 534, 536, a variable resistor 538, and a capacitor 540. The output 530 is coupled to the inverting input 518 of the op-amp 516 via a resistor 542, the inverting input 518 also being coupled via a capacitor 544 and a resistor 546 to the output 548 of the op-amp 516.

The circuitry associated with the op-amp/buffer 528 provides a reference voltage which is representative of the magnitude of the voltage output of the voltage doubler 456. Specifically, the voltage divider formed by resistors 520, 522, 534, 536 and the variable resistor 538 lowers the voltage present at the junction 526 to a smaller, yet proportional voltage, which is provided to the input of the op-amp 516. This output is buffered by the op-amp 528 before being passed to the op-amp 516.

The output 548 at the op-amp 516 is coupled via the resistors 550, 552, 554 to a non-inverting input 556 of a comparator 558. As stated before, the voltage at the output 548 is representative of a desired voltage to be provided by the inverter 24 to the motor 30, raised or lowered by a value proportional to the difference between the voltage at junction 524 of the voltage doubler 456 relative to the desired value. The voltage provided at the input 560 of the comparator 558 is used to synchronize the latching of the triac 472, and consequently the thyristor 458, to permit the power supply 22 to be connected to AC power supply inputs line 382, 384 at the appropriate position along the AC voltage waveform.

The reference voltage provided at the input 560 is generated as follows. A zero-crossing module 562 is coupled to the inputs 478, 482. The zero-crossing module 562 includes a comparator 564 with a non-inverting input 566 coupled via a first resistor 568 to the input 482 and via the parallel combination of a second resistor 570 and a capacitor 572 to the ground 54. The resistor 570 and the capacitor 572 act as a filter. An inverting input 574 of the comparator 564 is coupled via a resistor 576 to the input 478, and by the parallel combination of a resistor 578 and a capacitor 580 to the ground 54. Again, the resistor 578 and the capacitor 580 act as a filter. An output 582 of the comparator 564 is coupled to the non-inverting input 566 via a resistor 584. The zero-crossing module 562 operates to provide a reference voltage which is indicative of the point at which the AC voltage waveform passes through the zero-crossover point by comparing the voltage waveform amplitude at 382 against a reference voltage.

The output 582 of the zero-crossing module 562 is provided to a masking timer circuit 586 including a chip 588, and preferably a 555 chip. The chip 588 is configured to provide a pulse approximately 3.6 milliseconds after the zero-crossover point of the voltage wave form at the line 382, slightly less than a quarter cycle of the wave form. In particular, it will be noticed that the chip 588 has pins number 1–8 as is conventional. The pin #2 is coupled to the output 582 of the zero-crossing module 562 and, via a resistor 590, to the voltage V$^+$. The voltage V$^+$is also coupled to pins #4 and #8, and to pins #6 and #7 via a resistor 592. The pins #6 and #7 are also coupled via a capacitor 594 to the ground 54. Pins #1 and #5 are coupled to the ground 54, the pin #1 being coupled to the ground 54 directly while the pin #5 is coupled to the ground 54 via the capacitor 596. The output pin #3 is coupled via a diode 598, resistors 600, 602, 604 and a capacitor 606 to the inverting input 560 of the comparator 558.

It will be further noted that the non-inverting input 556 of the comparator 558 is coupled via a resistor 608 to the output 610 of the comparator 558. The output 610 of the comparator 558 is also coupled via a resistor 612 to the voltage V$^+$. By triggering the comparator 558, a transistor 614 is turned on, thereby allowing current to flow through a resistor 616 and the light emitting diode 474. While the voltage of the power supply controller 34 varies in a linear fashion with the higher control signal frequency at high speeds, it is preferable that voltage and control signal frequency do not preferably vary according to a linear relationship at lower control signal frequencies. Non-linearity is preferred at lower speeds because the voltage drop caused by the winding resistance becomes more significant. The linear relationship between the voltage and the frequency at high frequencies is altered at low frequencies through the use of a clamp circuit 618. The clamp circuit 618 includes a op-amp 620, having a non-inverting input 622 coupled to the voltage divider formed by resistors 624, 626 and an inverting input 628 coupled via a resistor 630 to the output of the chip 486, which is a reference voltage representative of the control signal frequency as is explained above. If the reference voltage from the chip 486 drops below a predetermined level set by the voltage divider of resistors 624, 626, the op-amp 620 turns on and provides an additionally voltage boost via the diode 632 to the non-inverting input 504 of the op-amp 506.

It will be recognized that the induction motor driver 20 described above provides several advantages. The motor driver 20 may be less expensive that those drivers presently on sale because the motor driver 20 uses rectangularly-shaped pulses to drive the motor 30, relying on the inductance characteristics of the motor 30 to filter out unwanted harmonics. The motor driver also may provide a permanent split capacitor motor with outputs in 90 degree phase so as to maintain 90 degree phase between main and auxiliary winding currents in the motor. Further, the motor driver 20 according to the present invention allows for the voltage and frequency of the pulses to be varied to balance the power at high and low speeds, and to even exceed the power rating of the motor 30 at higher speed where the pulses of high voltage magnitude are only applied to the motor 30 for a limited period of time.

As an alternative, instead of a voltage doubler, a simple rectifier circuit could be used, thereby reducing parts count and cost of materials. Such a substitution could be made, for example, where it was unimportant for the motor speed to exceed 100% of nominal speed. Such a substitution could also be made to provide a low cost mechanism by which a 115 VAC motor could be run using 230 VAC mains while maintaining the full speed range.

Other aspects, objects, and advantages of the present invention will be obtained from a study of the specification, drawings and appended claims.

I claim:

1. An induction motor driver comprising:

a DC power supply having a selectively variable voltage;

an inverter coupled to the DC power supply and coupleable to an induction motor, the inverter selectively actuateable to generate from the selectively variable voltage of the DC power supply a low-frequency series of square-shaped pulses, the series of square-shaped pulses having a frequency and each pulse having an amplitude related to the selectively variable voltage; and a motor driver controller coupled to the inverter and the DC power supply, the motor driver controller including a first selectively variable signal source to provide a speed signal representative of a desired motor speed, an oscillator coupled to the selectively variable signal source to generate a control signal having a frequency representative of the speed signal, an inverter controller coupled to the oscillator and the inverter to selectively actuate the inverter to vary the frequency of the series of square-shaped pulses in direct relation to the frequency of the control signal and a power supply controller coupled to the oscillator and the DC power supply to selectively vary the voltage of the power supply in direct relation to the frequency of the control signal.

* * * * *